Patented Sept. 26, 1933

1,928,436

UNITED STATES PATENT OFFICE 1,928,436

MERCURY DERIVATIVE OF NITRO-META-CRESOLS

George W. Raiziss and Le Roy W. Clemence, Philadelphia, Pa., assignors to Abbott Laboratories, North Chicago, Ill., a corporation of Illinois No Drawing. Application December 4, 1931
Serial No. 579,107

8 Claims. (Cl. 260—13)

Our invention relates to certain new compounds which have been found to be especially effective as bactericidal and bacteriostatic agents, particularly in combating infectious diseases, and relates more particularly to mercury derivatives of nitro-cresols.

In Raiziss Patent No. 1,554,293, granted September 22, 1925, and reissued as No. 17,563, dated January 14, 1930, and in Raiziss Patent No. 1,630,072, granted May 24, 1927, there are described certain mercury derivatives of nitro-ortho-cresol. These derivatives were found to have excellent properties as bactericides. However, our continued research has developed the fact that mercury derivatives of nitro-meta-cresol and their various isomers may likewise be prepared and that certain of these last mentioned derivatives possess markedly superior properties to those of the derivatives previously known.

These new nitro-cresol derivatives differ from each other, sometimes to a considerable extent, in their physical, chemical and bacteriological properties, and may be represented by the typical formula:

R—HgX for the mono-mercury derivatives, and

R—(HgX)₂ for the di-mercury derivatives, wherein R represents any of the isomers of nitro-meta-cresol and X represents an acetoxy group, CH₃COO—, a halogen, a hydroxy group —OH, or when a molecule of water is removed from the latter, an anhydro-hydroxy group —O—.

In preparing these new products, we mercurate any of the isomers of a nitro-meta-cresol and produce first an acetoxy-mercuri compound. This is then converted into an anhydro-hydroxy-mercuri derivative according to the following reactions:

C₆H₃.CH₃.NO₂.OH+Hg(OOC.CH₃)₂→
    C₆H₂.CH₃.NO₂.OH.HgCOO.CH₃+CH₃COOH

C₆H₂.CH₃.NO₂.OH.Hg.COO.CH₃+NaOH→
    C₆H₂.CH₃.NO₂.O.Hg+CH₃.COONa+H₂O

The hydroxy-mercuri derivatives are formed preferably as alkali metal salts in alkaline solution, as follows:

C₆H₂.CH₃.NO₂OH.HgCOOCH₃+2NaOH→
    C₆H₂CH₃.NO₂.ONa.HgOH+CH₃.COONa+H₂O

The halogen derivatives are formed by treating either the acetoxy, hydroxy or anhydro-hydroxy derivatives with a halide acid—thus:

C₆H₂.CH₃.NO₂.ONa.HgOH+2HCl→
    C₆H₂.CH₃.NO₂.OH.HgCl+NaCl.+H₂O

The nitro derivatives of meta-cresol tend to form di-mercury compounds even when using only one mole of mercuric acetate as above, except in the case of 6-nitro-meta-cresol which forms a mixture of mono-mercury and di-mercury compounds. This possibility is eliminated, however, if two moles (114 g.) of mercuric acetate are used, resulting in formation of only di-acetoxy-mercuri-nitro-meta-cresols.

Example 1

27.5 grams of 4-nitro-meta-cresol prepared by nitrating meta-cresol in acetic acid medium at low temperature (—5 to —8° C. (Berichte—42, 3098) are dissolved in 15.4 grams of NaOH and 1200 cc. of H₂O. To this is added 114 grams of mercuric acetate dissolved in 420 cc. of water and 24 cc. of acetic acid. The mixture is boiled until the nitro-cresol is completely mercurated, this being determined by removing a small portion of both precipitate and solution from the reaction mixture and adding to this a solution of sodium hydroxide. When a clear yellow to orange red solution is obtained the mercuration is complete. The mixture is cooled and filtered. The dried precipitate is then dissolved in boiling acetic acid, using sufficient acid to obtain a clear solution, which is filtered and cooled. Crystals of di-acetoxy-mercuri-nitro-cresol separate. This is repeated twice and the final batch of crystals is washed with acetone and dried.

The product, 2,6-diacetoxy-mercuri-4-nitro-meta cresol, consisting of pale yellow needles darkening at 240° C. and not melting below 300° C., may be represented by the formula:

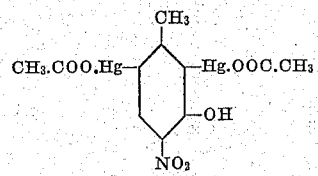

Example 2

Using 2-nitro-meta-cresol prepared by diazotization of meta-toluidine and subsequent decomposition in dilute nitric acid (Berichte—42, 3098) and employing the method and quantities described in Example 1, we obtain 4,6-diacetoxy-mercuri-2-nitro-meta-cresol:

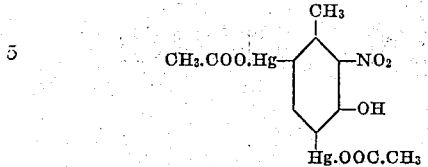

This product consists of pale greenish-yellow needles, darkening at 290° C., not melting below 300° C.

The compounds described above are usually dispensed in the form of their sodium salts in aqueous solution, the preparation of which will be obvious to those skilled in the art.

Nitro-meta-cresols ordinarily do not form monomercury derivatives, but on mercuration of 6-nitro-meta-cresol using one mole of mercuric acetate, a material was obtained which, on an attempt to recrystallize it from acetic acid, did not completely dissolve in the amount of acetic acid used. The small amount of insoluble material was crystallized independently from acetic acid. This substance gave an analysis which proved it to be monoacetoxy-mercuri-6-nitro-meta-cresol, and may be represented by the formula:

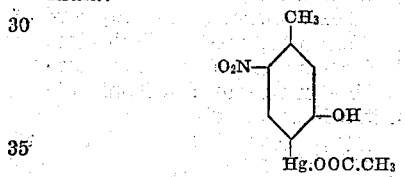

Changes and variations coming within the spirit of our invention will doubtless suggest themselves to those skilled in the art. Hence, we do not wish to be limited to the specific embodiments disclosed herein or uses mentioned except to the extent set forth in the appended claims, which are to be interpreted as broadly as the state of the art will permit.

We claim as our invention.

1. A mercury compound of a nitro-meta-cresol, said composition being characterized in that it is of high bactericidal value.

2. A mercury derivative of a nitro-meta-cresol, represented by the formula R(HgX)$_n$, where R represents the nucleus of a nitro-meta-cresol, X represents a group from the class consisting of acetoxy, a halogen, hydroxy, and anhydro-hydroxy, and $n$ represents a whole number not greater than 2.

3. An acetoxy-mercuri derivative of a nitro-meta-cresol, said composition being characterized in that it is of high bactericidal value.

4. A mercuri derivative of 4-nitro-meta-cresol, said composition being characterized in that it is of high bactericidal value.

5. Diacetoxy - mercuri - 4 - nitro - meta-cresol, which may be represented by the structural formula:

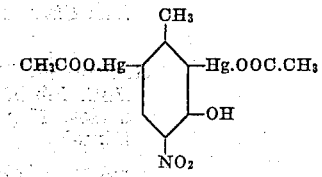

6. Di - acetoxy - mercuri - 2 -nitro-meta-cresol, which may be represented by the structural formula:

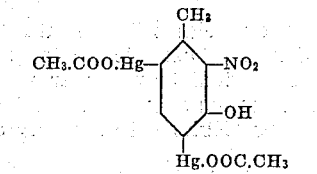

7. 4-acetoxy - mercuri - 6 - nitro - meta-cresol, which may be represented:

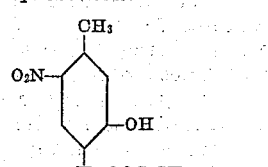

8. A mercury derivative of a nitro-meta cresol represented most probably by the formula

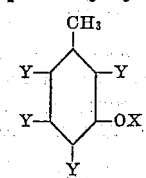

wherein X is either hydrogen or an alkali metal, one of the Y's is NO$_2$, at least one and not more than two of the Y's is hydrogen, and the remaining Y or Y's represent the radical—HgZ, Z being a halogen, a hydroxy group, an anhydro-hydroxy group or an acetoxy group, the mercury group or groups being ortho or para to the hydroxyl.

GEORGE W. RAIZISS.
LE ROY W. CLEMENCE.